Figure 1:
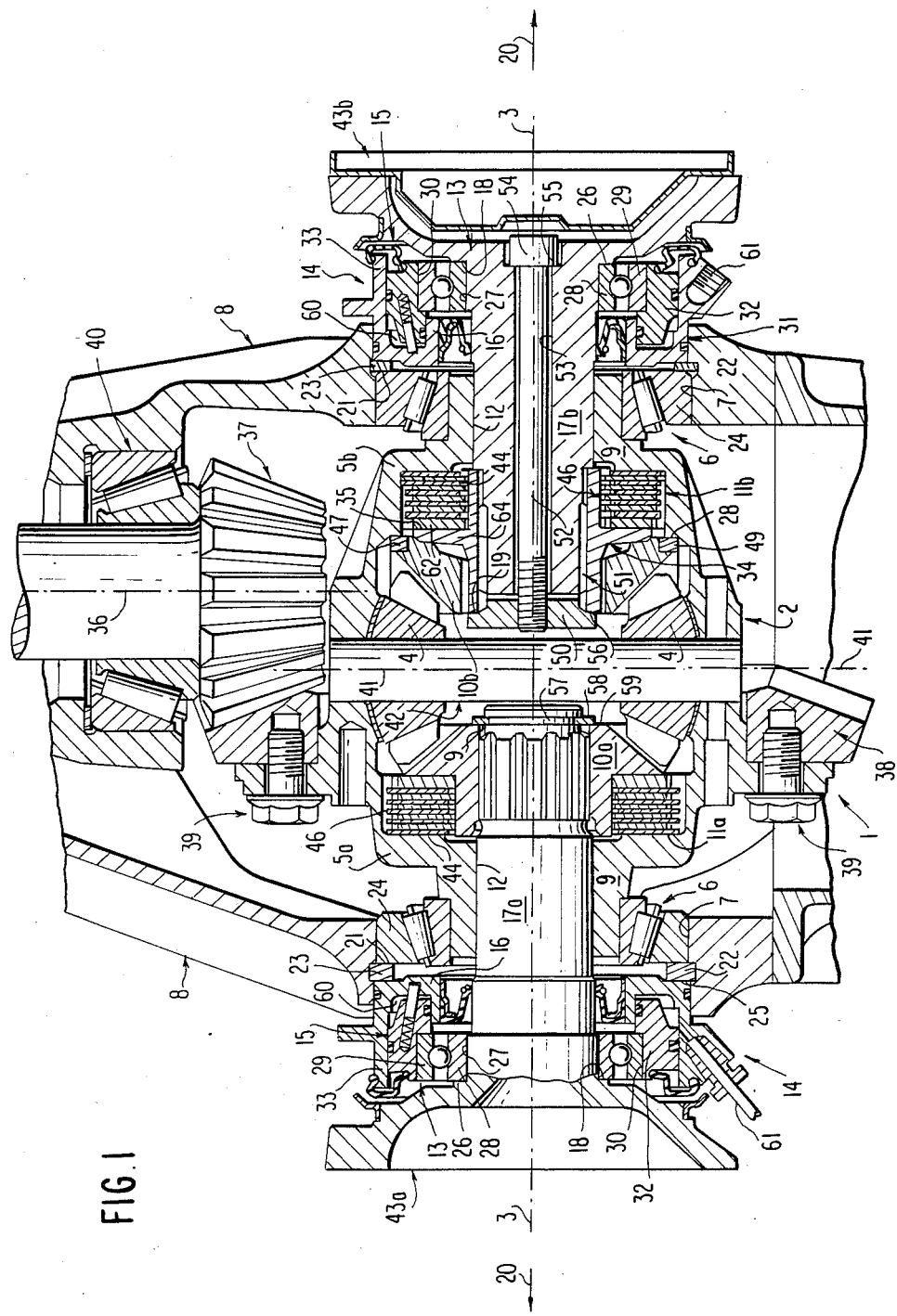

United States Patent [19]

von Hiddessen et al.

[11] Patent Number: 4,583,424

[45] Date of Patent: Apr. 22, 1986

[54] LIMITED SLIP DIFFERENTIAL WITH LOCKING CLUTCH OPERATED BY AN EXTERNAL ACTUATOR OF THE AXIAL PISTON-CYLINDER TYPE

[75] Inventors: Götz von Hiddessen, Uhingen; Dieter Wachtel, Korb, both of Fed. Rep. of Germany

[73] Assignee: Daimler-Benz AG, Fed. Rep. of Germany

[21] Appl. No.: 587,510

[22] Filed: Mar. 8, 1984

[30] Foreign Application Priority Data

Apr. 13, 1983 [DE] Fed. Rep. of Germany ....... 3313283

[51] Int. Cl.⁴ ............................................. F16H 1/44
[52] U.S. Cl. .................................... 74/710.5; 74/711; 74/713
[58] Field of Search ....................... 74/710.5, 711, 713

[56] References Cited

U.S. PATENT DOCUMENTS

| | | | |
|---|---|---|---|
| 2,734,398 | 2/1956 | Böttcher | 74/711 |
| 3,439,785 | 4/1969 | Hughson | 74/710.5 X |
| 3,446,320 | 5/1969 | Schott | 74/710.5 X |
| 3,605,965 | 9/1971 | Thomas et al. | 74/710.5 X |
| 3,894,446 | 7/1975 | Shoy et al. | 74/710.5 X |
| 3,974,717 | 8/1976 | Breed et al. | 74/713 |
| 4,412,459 | 11/1983 | Goscenski, Jr. | 74/713 X |

FOREIGN PATENT DOCUMENTS

| | | | |
|---|---|---|---|
| 1555317 | 10/1970 | Fed. Rep. of Germany | 74/710.5 |
| 1934340 | 1/1971 | Fed. Rep. of Germany | 74/710.5 |
| 2164324 | 6/1973 | Fed. Rep. of Germany | 74/710.5 |
| 858528 | 1/1961 | United Kingdom | 74/710.5 |

*Primary Examiner*—George H. Krizmanich
*Assistant Examiner*—Dirk Wright
*Attorney, Agent, or Firm*—Craig and Burns

[57] ABSTRACT

A limited slip differential comprises a differential gear housing in which a differential bevel gear is mounted and which has a journal supported by a rolling contact bearing arrangement in a bearing opening of an axle casing. A locking clutch which operatively connects a half-shaft bevel gear meshing with the differential bevel gear to the differential gear housing, and which lies between an axial abutment immovable relative to the differential gear housing and an axially movable pressure disc, is engaged by means of a pin type pressure member which is adapted to be operated, with the aid of a rolling contact bearing, by an actuator of the axial piston-cylinder type. A half-shaft part is rotationally fixed to the half-shaft bevel gear and passes through the journal. As a constructional simplification, a separate pressure member can be saved by disposing the actuator on the side of the rolling contact bearing arrangement opposite to the locking clutch and also arranging for it to act on a thrust bearing surface, lying axially outside the journal, of the half-shaft part used as pressure member, while the half-shaft part has another thrust bearing surface which acts on the pressure disc on engagement of the locking clutch.

12 Claims, 2 Drawing Figures

LIMITED SLIP DIFFERENTIAL WITH LOCKING CLUTCH OPERATED BY AN EXTERNAL ACTUATOR OF THE AXIAL PISTON-CYLINDER TYPE

The invention relates to a limited slip differential comprising a differential gear housing in which a differential bevel gear rotating in relation to a geometrical main axis is mounted and which has an outer journal supported by a rolling contact bearing arrangement in a bearing opening of an axle casing and also has an inner locking clutch which operatively connects a half-shaft bevel gear meshing with the differential bevel gear to the differential gear housing and which is disposed concentrically to the main axis and axially between an axial abutment immovable relative to the differential gear housing in each case and an axially movable pressure disc, the said clutch being adapted to be engaged, in the direction of the main axis pointing from the pressure disc to the axial abutment, by a pin type pressure member which passes outwards through an appertaining opening in the differential gear housing and which is operated with the aid of a rolling contact bearing by an annular actuator of the axial piston-cylinder type which is disposed, in the proximity of the rolling contact bearing arrangement of the journal, on the axle casing concentrically to the main axis, and wherein a half-shaft part is rotationally fixed to the half-shaft bevel gear and passes outwards through the journal.

In one known limited slip differential of this kind (German Offenlegungsschrift No. 2,164,324) the abutment used for the axial support of the stack of discs of the locking clutch is a radial pressure surface of the half-shaft bevel gear, which in turn is supported by its tooth engagement on the differential bevel gear. The locking clutch is engaged in the "pushing" direction by the actuator with the aid of pressure pins axially parallel to the half-shaft part. The ends of the pins at the opposite end to the stack of clutch discs act on a race, concentric to the journal, of a needle thrust bearing, the other race of which is integral with the axial piston of the actuator. In this known limited slip differential, relatively high production costs are caused in particular by the pressure pins.

Whereas in the above-mentioned known limited slip differential the direct action between the locking clutch and the half-shaft bevel gear gives rise to a locking moment resulting from the tooth pressure between the differential bevel gear and the half-shaft bevel gear, in another known limited slip differential of the kind mentioned at the start (German Offenlegungsschrift No. 1,934,340) this locking moment is eliminated by inserting between the stack of clutch discs and the half-shaft bevel gear an inherently rigid abutment disc which is immovable relative to the differential gear housing. As regards the use of an actuator and special pressure pins for operating the locking clutch, however, this limited slip differential coincides with the known limited slip differential of this type.

From British patent specification No. 858,528, limited slip differentials of a different type, with or without a locking moment dependent on tooth pressure, are known, in which the actuator of the axial piston-cylinder type and also the locking clutch are disposed in the differential gear housing.

With these known limited slip differentials, however, it is found to be a disadvantage that the pressure medium must be supplied from the non-rotating axle casing to the actuator by way of the journal, so that the sealing of seal surfaces rotating relative to one another is unavoidable.

An object of the invention, thus comprises ensuring that, for a limited slip differential having a locking clutch adapted to be operated by an actuator of the axial piston-cylinder type, while avoiding seals between seal surfaces rotatable in relation to one another, the cost of construction is kept low.

Taking as starting point a limited slip differential as described above, the object explained is achieved in advantageous manner employing an actuator disposed on the side of a rolling contact bearing arrangement opposite to a locking clutch and which also acts on a thrust bearing surface lying axially outside a journal of a half-shaft part used as a pressure member, while the half-shaft part has another thrust bearing surface which acts on a pressure disc on engagement of the locking clutch.

Another object of the invention is the provision of a limited slip differential of an actuator which works either in the "pulling" direction or in the "pushing" direction on a half-shaft part for the purpose of engaging a locking clutch, so that special pressure pins or the like for operating the clutch are not required.

Figure 2:
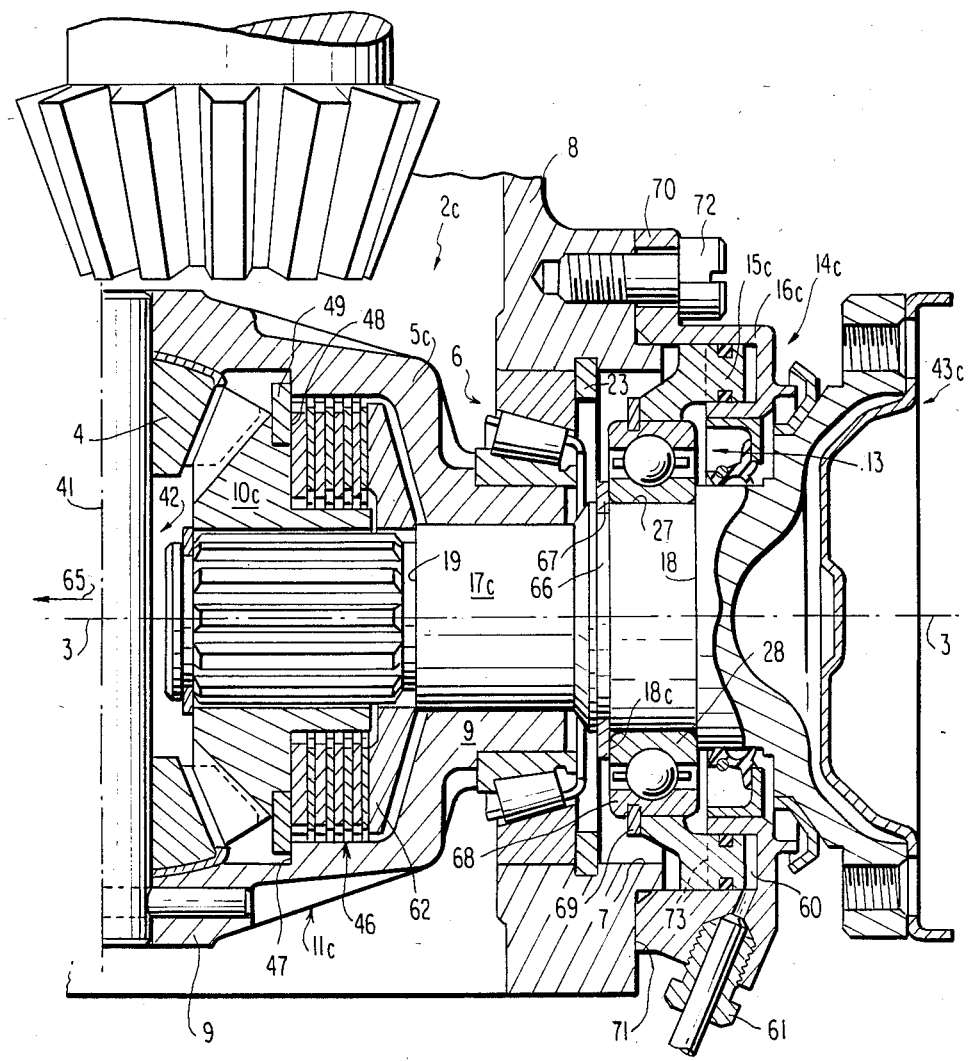

These and other objects, features and advantages of the present invention will become more apparent from the following description when taken in connection with the accompanying drawings which show, for the purposes of illustration only, plural embodiments in accordance with the present invention, and wherein:

FIG. 1 is an axial section of a rear axle drive showing half of each of two embodiments of the limited slip differential according to the invention, and FIG. 2 is an axial section, corresponding to that shown in FIG. 1, showing the third embodiment of the limited slip differential according to the invention.

Referring now to the drawings wherein like reference numerals designate like parts, and more particularly to FIG. 1, the figure shows a section through an axle casing 8 of a motor vehicle, taken in a plane which contains a geometrical main axis 3—3 and which plane lies parallel to the axis of rotation 36—36 of a drive pinion 37. The drive pinion 37, which is mounted in the axle casing 8 at right angles to the main axis 3—3 by means of a rolling contact bearing arrangement 40, meshes in the usual manner with a crown wheel 38, which by means of fastening bolts 39 is rotationally fixed to a differential gear housing 5a or 5b of a limited slip differential 1 or 2.

In a central reference plane 41—41 at right angles to the main axis 3—3 differential bevel gears 4, mounted for rotation on an internal cross pin 42 of the differential gear housing 5a or 5b, rotate relative to the main axis 3—3, each of them meshing with a half-shaft bevel gear 10a or 10b.

The half-shaft bevel gear 10a is directly mounted and rotationally fixed on a half-shaft part 17a, which is provided with an external connection flange 43a for its articulated connection to a drive half shaft for driving the left-hand rear wheel of the motor vehicle. Between corresponding radial pressure surfaces 44 and 45 of the differential gear housing 5a and the half-shaft bevel gear 10a is inserted a stack of discs 46, consisting of inner discs and outer discs disposed alternately one behind the other, of a locking clutch 11a, so that a locking moment resulting from the tooth pressure between the differential bevel gear 4 and the half-shaft bevel gear 10a is produced in this locking clutch. The engaging force is transmitted to the stack of discs 46 by way of a pressure disc 62 which is axially movable relative to the differential gear housing 5a and on which the pressure surface 45 acts.

Through this locking moment, the limited slip differential 1, of which FIG. 1 shows only the half starting from the reference plane 41—41 and associated with the half-shaft bevel gear 10a of the left-hand rear wheel, differs from the limited slip differential 2, of which on the other hand only the half starting from the reference plane 41—41 and associated with the half-shaft bevel gear 10b of the right-hand rear wheel is shown.

The tooth pressure on the half-shaft bevel gear 10b is taken by corresponding thrust bearing surfaces 47 and 48 of the differential gear housing 5b and the half-shaft bevel gear 10b, with the interposition of a slide ring 49. The half-shaft bevel gear 10b is mounted so as to be rotationally fixed and axially movable on an intermediate hub 34, which in turn is seated and rotationally fixed on the inner end of a half-shaft part 17b which is provided with an external connection flange 43b for its articulated connection to a drive half-shaft for driving the right-hand rear wheel of the motor vehicle. Between corresponding radial pressure surfaces 33 and 44 on a collar 64 of the intermediate hub 34 and on the differential gear housing 5b respectively there is once again inserted a stack of discs 46 of a locking clutch 11b, comprising inner discs and outer discs disposed alternately one behind the other. For the operation of the stack of discs 46 use is once again made of a pressure disc 62, which is axially movable relative to the differential gear housing 5b and on which the pressure surface 35 acts. The intermediate hub 34 is clamped in the axial directions by means of a bearing disc 50 on a shaft portion 51 of reduced diameter at the inner end of the half-shaft part 17b, with the aid of an anchor bolt 52 screwed to the bearing disc 50 and supported by its head 54 against a shoulder 55 in the through hole 53. The thrust bearing surface 19 of the bearing disc 50 lying against the inner end face 56 of the intermediate hub 34 is used to operate the locking clutch 11b in the outwardly pointing axial direction 20 of the main axis 3—3.

In corresponding fashion, for the purpose of operating the locking clutch 11a of the other limited slip differential 1, use is made of an inner thrust bearing surface 19, which is formed by an end face of a securing ring 58 inserted into a peripheral groove 57 at the inner end of the half-shaft part 17a, and which lies against the neighboring end face 59 of the associated half-shaft bevel gear 10a.

The limited slip differentials 1 and 2 also coincide as to the following features, for which the same reference numeral is used in both embodiments. A journal 9, provided on the differential gear housing 5a or 5b and having a central housing opening 12 for the passage of the respective half-shaft part 17a or 17b, is supported, by a rolling contact bearing arrangement 6 in a bearing opening 7 of the axle casing 8, centrally in relation to the main axis 3—3. The axial abutment used for the rolling contact bearing arrangement 6 is a securing ring 23 which is inserted into a peripheral groove 22 in the bearing opening 7 and against the facing end face 21 of which the outer race 24 of the rolling contact bearing arrangement 6 is supported. Against the other end face 25 of the securing ring 23 is supported an annular cylinder 16, likewise inserted into the bearing opening 7, of an actuator 14. An annular axial piston 15 works in the cylinder 16 and has an outer axial shoulder 30 into which is inserted an outer race 29 of a radial grooved ball bearing 13 used as rolling contact bearing for the rotational support of the axial piston 15 on the half-shaft part 17a or 17b. At the transition from the respective connection flange 43a or 43b to the shaft portion, each half-shaft part 17a or 17b is provided with an external thrust bearing surface 18, with an adjoining cylindrical bearing surface 27 over which the inner race 28 of the rolling contact bearing 13 is slipped, the facing end face 26 of which race cooperates with the thrust bearing surface 18. For the support of the rolling contact bearing 13 the outer wall 31 of the cylinder 16 is provided with an overhanging wall portion 33, which gives external support to the piston portion 32 provided with the shoulder 30. The working pressure chamber 60 of the actuator 14 can be placed under pressure by means of a pressure connection 61 of the cylinder 16, in order to intensify or produce a locking moment in the respective locking clutch 11a or 11b either arbitrarily and/or in dependence on one or more parameters, e.g., of the driving conditions.

In both limited slip differentials the axial piston 15 is loaded with pressure in the axial direction 20, pointing from inside to outside, of the main axis 3—3, so that an operating force is applied by way of the rolling contact bearing 13 to the half-shaft part 17a or 17b in the "pulling" sense, whereby the respective locking clutch 11a or 11b is operated to engage.

The halves of the two limited slip differentials 1 and 2 not shown in the drawing can be constructed as the mirror images of the halves shown.

When the known mounting of German Offenlegungsschrift No. 2,164,324 is applied, the outer race 24 of the rolling contact bearing arrangement 6 and the actuator 14 could however also be inserted or integrated into a bearing cover inserted into the bearing opening 7.

In the third embodiment, shown in FIG. 2, items coinciding with the first two embodiments, as indicated in the description given above, are given the same reference numerals. Reference numerals to which the reference letter "c" is appended relate to modifications, characteristic of the third embodiment, of the comparable items of the first two embodiments.

According to FIG. 2, the tooth pressure of the half-shaft bevel gear 10c meshing with the differential bevel gears 4 for the drive half-shaft of the right-hand rear wheel is taken, as in the case of the limited slip differential 2, by means of corresponding pressure surfaces 47 and 48 on the differential gear housing 5c and of an interposed slide ring 49. Between the slide ring 49 and the journal 9, which is supported by the rolling contact bearing arrangement 6 in the bearing opening 7 of the axle casing 8, is disposed a pressure disc 62 which, together with the half-shaft bevel gear 10c, is rotationally fixed on the half-shaft part 17c, and which is adapted to be operated by a thrust bearing surface 19, lying axially inside the journal 9, of the half-shaft part 17c, in the direction 65 of the main axis pointing towards the plane of rotation 41—41, in order to compress the stack of discs 46, lying between the slide ring 49 and the pressure disc 62, of the locking clutch 11c. For this purpose the inner race 28 of the rolling contact bearing 13, which is operated by the axial piston 15c of the actuator 14c with the aid of its outer race 29, acts on the end face 18c of a securing ring 67 inserted into a peripheral groove 66 in the half-shaft part 17c. In corresponding manner a securing ring 69 inserted into a peripheral groove 68 in the outer race 29 is provided for the axial piston 15c. The cylinder 16c holding the axial piston 15c, which works in the "pushing" sense, has a radially outer annular flange 70 which is clamped by means of fastening bolts 72 on the outer end face 71 of the bearing opening 7. On its opposite side to that where the securing ring 69 is disposed, the axial piston 15c is adapted to be loaded with the working pressure of the working pressure chamber 60, which can be fed through a pressure connection 61.

The outlet opening 73 of the cylinder 16c for the passage of the axial piston 15c lies on the axially inner side.

For its articulated connection to the drive half shaft, the half-shaft part is provided with a connection flange 43c.

The pressure force applied by the pressure disc 62 is taken by the teeth of the differential bevel gear 4c.

While we have shown and described several embodiments in accordance with the present invention, it is understood that the same is not limited thereto bus is susceptible to numerous changes and modifications as known to one having ordinary skill in the art, and we therefore do not wish to be limited to the details shown and described herein, but intend to cover all such modifications as are encompassed by the scope of the appended claims.

We claim:

1. A limited slip differential comprising a differential gear housing in which a differential bevel gear rotating in relation to a geometrical main axis is supported by a rolling contact bearing arrangement in a bearing opening of an axle casing and also has an inner locking clutch which operatively connects half-shaft bevel gear meshing with the differential bevel gear to the differential gear housing and which is disposed concentrically to the main axis and axially between an axle abutment immovable relative to the differential gear housing and an axially movable pressure disc, the said clutch being adapted to be engaged, in the direction of the main axis pointing from the pressure disc to the axial abutment, by a half-shaft part which passes outwards through an opening in the differential gear housing and which is operated with the aid of a rolling contact bearing by an annular actuator of the axial piston-cylinder type which is disposed, in the proximity of the rolling contact bearing arrangement of the journal, on the axle casing concentrically to the main axis, said half-shaft part being rotationally fixed to the half-shaft bevel gear and passing outwards through the journal, wherein the actuator is disposed on the side of the rolling contact bearing arrangement opposite to the locking clutch and also acts on a thrust bearing surface lying axially outside the journal of the half-shaft part used as pressure member, while the half-shaft part has another thrust bearing surface which acts on a pressure disc on engagement of the locking clutch.

2. A limited slip differential according to claim 1, wherein both the cylinder of the actuator and an outer race of the rolling contact bearing arrangement are inserted directly into the bearing opening of the axle casing.

3. A limited slip differential comprising a differential gear housing in which a differential bevel gear rotating in relation to a geometrical main axis is supported by a rolling contact bearing arrangement in a bearing opening of an axle casing and also has an inner locking clutch which operatively connects a half-shaft bevel gear meshing with the differential bevel gear to the differential gear housing and which is disposed concentrically to the main axis and axially between an axial abutment immovable relative to the differential gear housing and an axially movable pressure disc, the said clutch being adapted to be engaged, in the direction of the main axis pointing from the pressure disc to the axial abutment, by a half-shaft part which passes outwards through an opening in the differential gear housing and which is operated with the aid of a rolling contact bearing by an annular actuator of the axial piston-cylinder type which is disposed, in the proximity of the rolling contact bearing arrangement of the journal, on the axle casing concentrically to the main axis, said half-shaft part being rotationally fixed to the half-shaft bevel gear and passing outwards through the journal, wherein the actuator is disposed on the side of the rolling contact bearing arrangement opposite to the locking clutch and also acts on a thrust bearing surface lying axially outside the journal of the half-shaft part used as pressure member, while the half-shaft part has another thrust bearing surface which acts on a pressure disc on engagement of the locking clutch, wherein both the cylinder of the actuator and an outer race of the rolling contact bearing arrangement are inserted directly into the bearing opening of the axle casing, and wherein the outer race is adapted to be supported on a first end face of a securing ring inserted into a peripheral groove in the bearing opening of the axle casing and the cylinder is adapted to be supported on a second end face.

4. A limited slip differential according to claim 1, wherein an end face of an inner race, slipped over an axially adjoining cylindrical bearing face of the half-shaft part of a radial grooved ball bearing used as rolling contact bearing for the actuator, lies against the outer thrust bearing surface.

5. A limited slip differential according to claim 4, wherein the outer race of the radial grooved ball bearing is inserted into a shouldered portion of the axial piston and the outer wall of the cylinder has a wall portion radially supporting a piston portion provided with the shoulder.

6. A limited slip differential according to claim 5, wherein the thrust bearing surface, associated with the pressure disc of the limited slip differential acts on an intermediate hub which is concentric to the main axis and which is rotationally fixed in relation to the half-shaft bevel gear and half-shaft part and is provided with a collar acting by means of a pressure surface in the engagement direction on the pressure disc, and that the half-shaft bevel gear is axially displaceable relative to the intermediate hub and is immovable relative to the differential gear housing in the direction of the main axis pointing towards the locking clutch.

7. A limited slip differential according to claim 6, wherein the axial abutment is disposed in the directions of the main axis between the pressure disc and the thrust bearing surface cooperating with the actuator.

8. A limited slip differential according to claim 4, wherein the pressure disc is disposed in the directions of the main axis between the axial abutment and the outer thrust bearing surface cooperating with the actuator.

9. A limited slip differential according to claim 8, wherein for the outer thrust bearing surface use is made of a securing ring inserted in a peripheral groove in the half-shaft part.

10. A limited slip differential according to claim 9, wherein the axial piston acts on a securing ring inserted into a peripheral groove in the outer race of the radial grooved ball bearing.

11. A limited slip differential according to claim 10, wherein the cylinder has an annular flange which is clamped on an axially outer end face of the bearing opening.

12. A limited slip differential according to claim 11, wherein the outlet opening of the cylinder for the axial piston lies on the end face of the cylinder facing the rolling contact bearing arrangement.

* * * * *